United States Patent [19]
Black et al.

[11] 3,815,999
[45] June 11, 1974

[54] DYNAMIC LOAD FORCE CALIBRATING SYSTEM AND A METHOD FOR ITS USE IN A MOTION TEST SYSTEM

[75] Inventors: Dewie E. Black, Dearborn Heights; Donald F. Fabry, Garden City, both of Mich.

[73] Assignee: Burroughs Corporation, Detroit, Mich.

[22] Filed: July 5, 1972

[21] Appl. No.: 269,169

[52] U.S. Cl............ 356/138, 350/272, 250/237 G, 356/32
[51] Int. Cl. ............................................ G01b 11/26
[58] Field of Search ...... 356/138, 159, 32; 350/272; 250/237 G

[56] References Cited
UNITED STATES PATENTS
2,938,378  5/1960  Canada et al...................... 350/272
3,054,902  9/1962  Timms et al........................ 250/237

*Primary Examiner*—Ronald L. Wibert
*Assistant Examiner*—Conrad Clark
*Attorney, Agent, or Firm*—Michael B. McMurry; Edwin W. Uren; Edward G. Fiorito

[57] ABSTRACT

A dynamic load force calibrating device is provided in which the displacement of one moving member to which a driving force is being applied relative to a following member to which it is resiliently coupled and to which an adjustable load force is being applied is compared to a reference displacement representative of a desired load force to dynamically verify thereby the amount of load force being applied.

8 Claims, 8 Drawing Figures

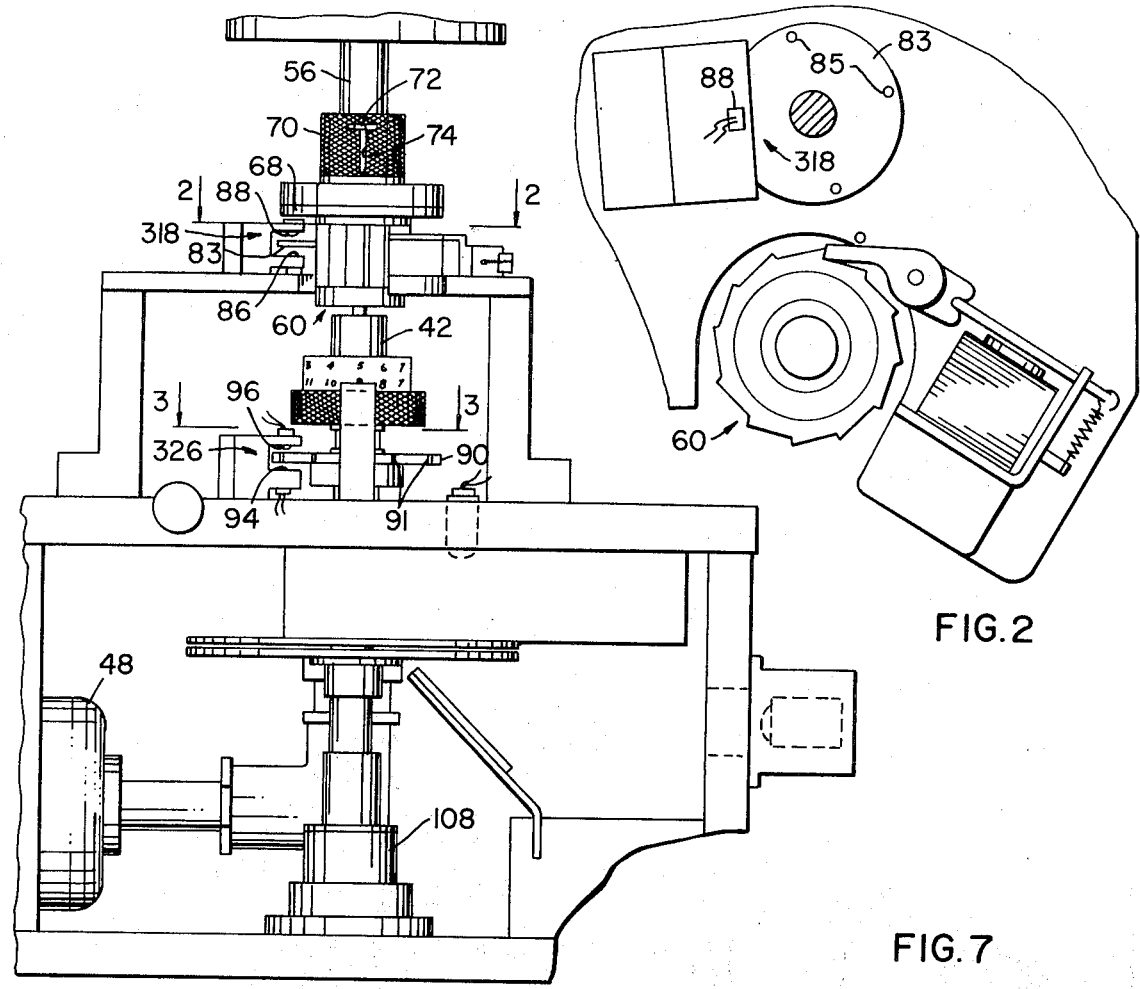
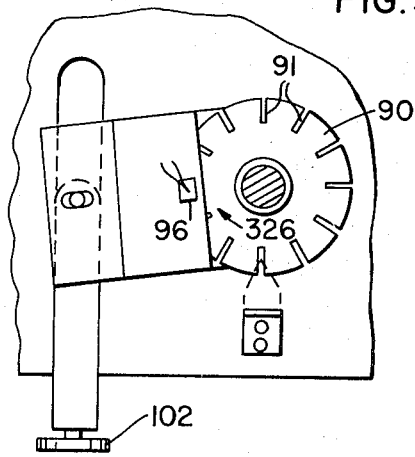
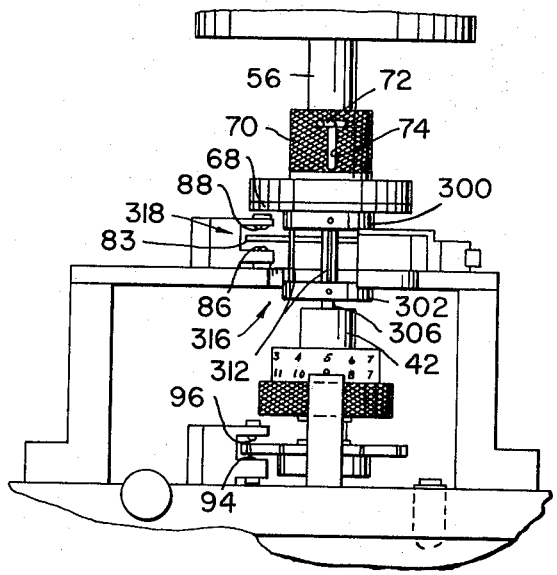

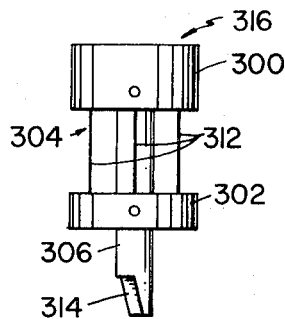
FIG. 5
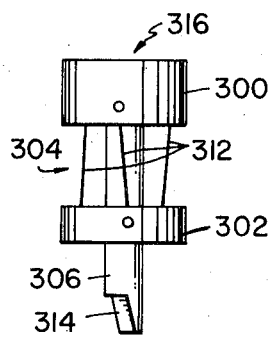
FIG. 6
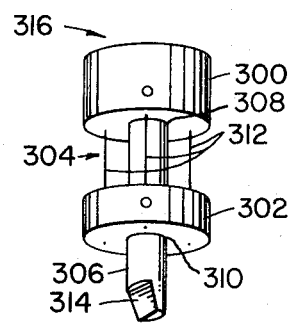
FIG. 4
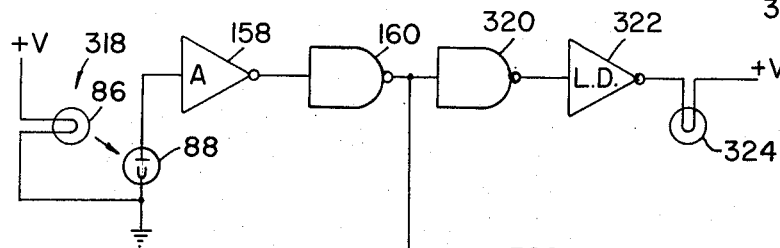
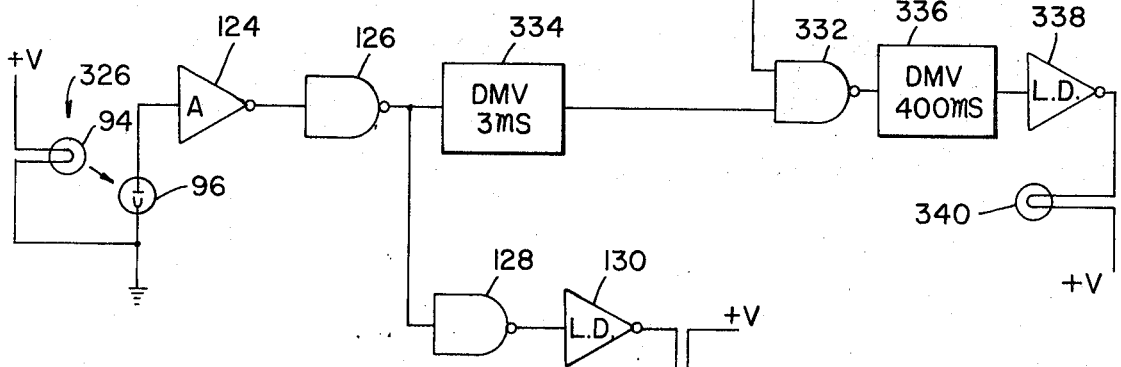
FIG. 8

DYNAMIC LOAD FORCE CALIBRATING SYSTEM AND A METHOD FOR ITS USE IN A MOTION TEST SYSTEM

CROSS-REFERENCE TO A RELATED APPLICATION

The present invention is related to the Motion Test System disclosed and claimed by Messrs. D. E. Black, D. F. Fabry and T. Dombrowski in a patent application, Ser. No. 176,844, now abandoned, and refiled as a continuation Ser. No. 396,783, filed Sept. 13, 1973, assigned to the assignee of the present application. The device of the present application may be used to facilitate the pre-operation calibration of the test system of the cross-referenced application.

BACKGROUND OF THE INVENTION

This invention relates generally to load force calibrating devices and more particularly to dynamic load force calibrating devices.

Prior art discloses several methods of determining the amplitude of a particular, unknown load force being applied to a movable object. A common method involves a direct, static measurement of the force acquired by coupling a measuring device or gage to the movable object and applying a force thereto in opposition to the load force, gradually increasing the applied force until the load force is overcome as evidenced by a movement of the object. This method lends itself to the use of relatively simple and inexpensive measuring devices, but inaccuracies are likely to result from the difficulties inherent in determining at what precise instant during the object's resulting movement to take the measurement. The force measured by a typical gage would vary depending on whether the object was stationary, moving at a constant speed or was being accelerated at the time the measurement was taken. Since the object speed involved in this method is relatively low, additional discrepancies would arise between the value of the load force at this speed and that at a higher, standard operating speed due to a change in the frictional load force caused by a resulting rise in the operating temperature. Other methods of determining the amplitude of an unknown load force involves the computation thereof based on the assimilation of a number of dynamically and statically ascertainable physical factors, such as temperature, speed and vibration, resulting from the application of a load force to a moving object. These methods are subject to the disadvantages, however, of being relatively complex and expensive.

SUMMARY OF THE INVENTION

The invention resides in the provision of a pair of resiliently coupled members which are mutually displaceable when a driving force is applied to one and a load force is applied to the other, the displacement being representative of the amount of load force being applied, the proper amount of this force being verified by logically gating the specifically delayed output from a photoelectric element monitoring the moving member to which the driving force is being applied with the simultaneous output of another photoelectric element monitoring the following member to which the load force is being applied, a proper amount of load force being indicated by the enabling of the gate.

Accordingly, it is an object of the present invention to provide a dynamic load force calibrating device which is capable of being used to calibrate the load force of a motion test system under conditions identical to those of actual operation.

It is another object of the invention to provide a device which is extremely accurate.

It is yet another object of the invention to provide a device which is relatively inexpensive to construct and maintain.

Still another object of the invention is to provide a relatively quick method of calibrating the load force of a motion test system.

An important aspect of the invention is the use of a pair of resiliently coupled members which are mutually displaceable when a driving force is applied to one and a load force to the other, the amount of displacement being representative of the amount of load force being applied.

Another important aspect of the invention is the use of photoelectric, delay and logic gating elements to compare the mutual displacement of the resiliently coupled members to a reference displacement representative of a desired load force to thereby verify the amount of load force actually being applied.

BRIEF DESCRIPTION OF THE DRAWINGS

These and other objects, aspects and advantages of the invention will be more clearly understood from the following description when read in conjunction with the accompanying drawings, in which:

FIG. 1 is a side view, partially fragmented, of an automatic motion test system typical of those employing the invention;

FIG. 2 is an enlarged, top view of a portion of the motion test system illustrating the effective engagement of a solenoid-controlled pawl with a typical, ratchet-controlled, spring-type clutch and showing also the relative disposition of an input monitor device, the view being taken along the line 2—2 of FIG. 1;

FIG. 3 is an enlarged, top view of a portion of the motion test system showing an output monitor device and its associated adjustment mechanism, the view being taken along the line 3—3 of FIG. 1;

FIG. 4 is a perspective view of a dynamic load force calibrating device embodying features of the invention and shown removed from the motion test system;

FIG. 5 is a side view of the device of FIG. 4 shown in its normal configuration;

FIG. 6 is a side view of the device of FIG. 5 shown as with load torque applied;

FIG. 7 is a fragmentary side view of the motion test system of FIG. 1 shown with the device of FIG. 4 operatively installed; and FIG. 8 is a diagram of the input and output monitor, delay and comparison logic used in the dynamic load force calibrating system.

The logic elements depicted in FIG. 8 are standard AND gates, drivers, amplifiers and delay multivibrators.

DETAILED MECHANICAL DESCRIPTION OF THE INVENTION

The dynamic load force calibrating device generally indicated at 316, shown in FIGS. 4, 5 and 6 has an input member 300, an output member 302, a coupling means or flexure, generally indicated at 304, and a guide member 306. The input member 300 and the output member 302 are right circular cylinders each having a circular aperture, 308 and 310 respectively, centrally and longitudinally disposed therein and are coaxially spaced apart. The flexure 304 is formed of three resilient wire elements 312 extending from the input member 300 to the output member 302, the wires being parallel to and symmetrically spaced about the common axis of rotation of the members such that the angular displacement imparted to the input member 300 is resiliently and uniformly communicated to the output member 302. The guide member 306 is a right circular shaft passing affixedly through the aperture 310 in the output member 302 and passing slidably and rotatably through the aperture 308 in the input member 300, thereby providing a guide for the rotation of the input member relative to the output member. The shaft 306 extends beyond the output member 302, and a chordal flat 314 is formed at its distant end to facilitate the operable coupling of a load torque device to the output member.

OPERATION OF THE INVENTION

An automatic motion test system is shown by FIGS. 1, 2 and 3. A detailed mechanical and operational description of this system as used to test spring-type, ratchet-controlled clutches is provided in the cross-referenced application. The system shown has a clutch 60 disposed therein for testing. Prior to calibrating the motion test system, a dynamic load torque calibrating device, generally indicated at 316, is substituted for the clutch. To remove the clutch 60, a mounting collar 70 is rotated until a slot 74 therein is aligned with a mounting pin 72 and is then slid upward along an input coupling shaft 56 until sufficient clearance is provided to remove the clutch. The calibrating device 316, having previously had a drive ring 68 pressed over its input member 300, may then be mounted by inserting its guide shaft 306 into an aperture in the top of an upper mounting sleeve 42, seating the shaft so that the chordal flat 314 at its distant end is in angular abutment with a complementary flat formed within the apertured sleeve. When the guide shaft is properly seated, the upper mounting sleeve will rotate therewith. The mounting collar 70 is then lowered, a pair of drive pins (not shown) depending therefrom being received by associated apertures in the drive ring 68 such that the two will rotate together. The collar 70 is then rotated with respect to the input coupling shaft 56 so that the mounting pin 72 radially extending from the latter rests in the appropriate arm of the T-shaped slot 74 as shown. With the calibrating device 316 mounted in the motion test system as shown by FIG. 7, the load torque applied to the output member 302 by a drag mechanism 108 (FIG. 1), typically an electrically operated, magnetic particle clutch, may be calibrated.

With electrical power applied to the system as shown by FIG. 8, the input drive is manually rotated until an input disk 83 of the input position detector, generally indicated at 318, is angularly disposed such that one of the apertures 85 therein is positioned between an input light projector 86 and an input light detector 88. When the detector 88 is exposed to light from the projector 86, it completes a circuit from a ground potential to the input of a cell amplifier 158. This signal is inverted by the amplifier and again by a gate 160. (NOTE: The elements, 86, 88, 158 and 160, are present as herein described in the system of the cross-referenced application.) The signal is fed from this point through another gate 320 and a lamp driver 322, each of which inverts the signal. As a result, an INPUT ZERO indicator lamp 324 will be lit. An adjusting screw 102 (FIG. 3) is then manually rotated until the path of light traveling from an output light projector 94 to an output light detector 96 is aligned with one of the slots 91 on an output disk 90 of the output position detector, generally indicated at 326. When the detector 96 is exposed to light from the projector 94, the input of an associated cell amplifier 124 is driven low. The resulting high output from the amplifier is then inverted by a gate 126 and again inverted by another gate 128 before being applied to a lamp driver 130 to actuate a SET-UP ZERO indicator lamp 132. (NOTE: The elements 94, 96, 124, 128, 130 and 132 are present as herein described in the system of the cross-referenced application.)

With the INPUT ZERO and the SET-UP ZERO indicator lamps, 324 and 132 respectively, both lit, showing the apparatus to be in proper disposition to begin a calibrating operation, electrical power is next applied to the motor 48 driving the motion test system. As the motor rotates the input member 300, this rotary motion is communicated to the output member 302 by the resilient wire elements 312. The drag mechanism 108 applies a load torque to the output member 302, however, such that, although it rotates at the same, constant speed as the input member 300, it lags behind by an amount of angular displacement proportional to the amount of load torque applied by the drag mechanism 108. The electrical signals emitted by the output light detector 96 will therefore occur later than those emitted by the input light detector 88, the difference in time also being proportional to the amount of load torque being applied to the output member 302. The input position detector signal, as it appears at the output of the gate 160 is applied to a delay multivibrator 328, the positive-going output pulse width of which is equal to the interval of time representative of the desired load torque, in this case 12 milliseconds. When the output of the delay multivibrator 328 goes low again, a 100 microsecond pulse is generated by a delay multivibrator 330 and is applied to one leg of an AND gate 332. The output position signal, as it appears at the output of the gate 126 is applied to a delay multivibrator 334, the positive-going output pulse thereof being applied to the remaining leg of the AND gate 332, the pulse being of such a width, in this case 3 milliseconds, as to provide an acceptance interval during which the gate 332 may be enabled by the timely arrival of a delayed input position signal from the delay multivibrator 330. If gate 332 is enabled, a delay multivibrator 336 connected to its output will provide a 400 millisecond pulse which, when applied to a lamp driver 338, will light a LOAD MATCH indicator lamp 340, thus giving visual indication that the load torque applied by the drag mechanism 108 to the output member 302 is as desired. If the amount of load torque applied is not correct, the displacement of the output member 302 relative to the input member 300 will not be as anticipated. The difference in time between the emissions of the input light detector 88 and the output light detector 96 will not equal the specified 12 millisecond delay, and gate 332 will not be enabled. The LOAD MATCH indicator lamp 340 will, therefor, not be lit. The drag mechanism 108 must then be adjusted until the load torque applied to the output member 302 is such that the displacement thereof relative to the input member 300 is representative of the time delay required to cause the gate 332 to be enabled, lighting the LOAD MATCH indicator lamp 340. Ideally, the 400 millisecond pulse provided by the delay multivibrator is adequate to sustain the lamp 340 until a subsequent set of signals arrive from the input and output light detectors 88 and 96 respectively. Thus, when the drag mechanism 108 is correctly adjusted, the LOAD MATCH indicator lamp 340 will remain lit continuously.

With the load torque of the motion test system correctly adjusted, the calibrating device may be removed and clutches inserted and tested as described in the cross-referenced application.

While the dynamic load force calibrating system has been shown and described in considerable detail, it should be understood that many changes and variations may be made therein without departing from the spirit and scope of the invention.

What is claimed is:

1. A dynamic load torque calibrating system comprising:
    an input member rotatably drivable about an axis;
    an output member rotatable about an axis and coaxially spaced apart from said input member;
    a flexure coupling for coupling said input member to said output member, resulting in said output member being angularly displaceable relative to said input member in proportion to the amount of load torque applied to said output member;
    an input position detector for generating an input signal indicating the angular position of said input member;
    an output position detector for generating an output signal indicating the angular position of said output member; and
    a comparator circuit responsive to said input signal and to said output signal for effectively comparing, the difference in angular disposition between said input member and said output member and thereby the amount of load torque applied to said output member, said comparator circuit including:
    a delay element for delaying said output signal by an amount of time proportional to a predetermined displacement of said output member relative to said input member;
    a gating element, utilizing as inputs the signal from said delay element and said input signal, for generating a calibrating signal indicating that said input member is displaced a predetermined amount from said output member;
    a first pulse generating element operably coupled between said input position detector and said logic gating element for providing said input signal with an electrical pulse having a precise duration; and
    a second pulse generating element operably coupled between the other input of said logic gating element and said delay element providing said delayed output signal with an electrical pulse having a precise duration substantially greater than that provided by said input signal, thereby effectively establishing a predetermined acceptance interval during which the timely arrival of said output signal pulse from said first pulse generating element will enable said logic gating element.

2. A dynamic load torque calibrating system as defined by claim 1 wherein said flexure coupling comprises a plurality of resilient wires extending between said input member and said output member, thereby providing a rotational degree of freedom for the output member relative to the input member about their common axis of rotation.

3. A dynamic load torque calibrating system as defined by claim 1 and additionally having shaft secured to said output member and passing rotatably through an aperture in said input member, thereby providing a guide for the rotation of said input member relative to said output member, said shaft extending beyond said output member to provide a means for coupling an externally applied load torque to said output member.

4. A dynamic load torque calibrating system as defined by claim 1 wherein said input position detector comprises:
    an input light projector;
    an input light detector for detecting light emissions from said input light projector and generating said input signal;
    a first optically apertured input disk operably coupled to said input means for rotation therewith, the apertures in said first disk thereby being revolved between said input light projector and said input light detector, effective to generate said input signal; and
    said output position detector comprises:
    an output light projector;
    an output light detector for detecting light emissions from said output light projector, and generating said output signal; and
    a second optically apertured output disk operably coupled to said output means for rotation therewith, the apertures in said second disk thereby revolved between said output light projector and said output light detector effective to generate said output signal.

5. A dynamic load torque calibrating system as defined by claim 1 and additionally having a visual indicator lamp operably responsive to said calibrating signal.

6. A dynamic load force calibrating system comprising:
    input means for receiving external driving forces applied thereto;
    output means for receiving external load forces applied thereto;
    flexible coupling means operably disposed between said input means and said output means for resiliently communicating the motion of said input means to said output means, said coupling means including at least one flexure member each of which is secured at one of its ends to said input means and secured at the other end to said output means;
    an input light projector;
    an input light detector for generating an electrical output signal responsive to light emissions from said input projector;
    an optically apertured input disk operably coupled to said input means for rotation therewith, the apertures in said disks thereby being revolved effectively between said input light projector and said input light detector, the electrical output of said input light detector being responsive to the passage of the aperture;

an output light detector for generating an electrical output signal responsive to light emissions received from said output light projector;

an optically apertured output disks operably coupled to said output means for rotation therewith, the apertures in said disks thereby being revolved effectively between said output light projector and said output light detector, the electrical output of said output light detector being responsive to the passage of the aperture thereby;

a delay element for delaying said electrical output signal received from said input light detector by an amount of time proportional to a predetermined displacement of said output means relative to said input means;

a logic gating element for gating the delayed electrical output signal received from said delayed element and said electrical output signal received from said output light detector, said gating element having an electrical output indicative of the coincidence of its input signals and thereby the amount of load force applied to said output means;

a first pulse generating element operably coupled to a first input of said logic gating element responsive to the delayed electrical output signal received from said delay element for providing an electrical pulse having a precise duration; and a second pulse generating element operably coupled to a second input of said logic gating element and being responsive to said electrical output signal received from said output light detector for providing an electrical pulse having a precise duration substantially greater than that provided by said first pulse generating element thereby effectively establishing a predetermined acceptance interval during which the timely arrival of a pulse from said first pulse generating element will enable said logic gating element.

7. A dynamic load force calibrating system as defined by claim 6 wherein said input means comprises:

a member configured with an aperture longitudinally disposed therein; and additionally including a guide member secured to said output means and rotatably inserted into the apertures of said input means to selectively restrict the number of degrees of freedom of motion of said output means relative to said input means.

8. The dynamic load force calibrating system as defined by claim 6 additionally having a visual indicator lamp operably responsive to said electrical output of said logic gating elements of said comparing means.

* * * * *